US011423336B2

(12) United States Patent
Khiari et al.

(10) Patent No.: US 11,423,336 B2
(45) Date of Patent: Aug. 23, 2022

(54) METHOD AND SYSTEM FOR MODEL INTEGRATION IN ENSEMBLE LEARNING

(71) Applicant: NEC Laboratories Europe GmbH, Heidelberg (DE)

(72) Inventors: Jihed Khiari, Vienna (AT); Luis Moreira-Matias, Heidelberg (DE); Saso Dzeroski, Ljubljana (SI); Bernard Zenko, Ljubljana (SI)

(73) Assignee: NEC CORPORATION, Tokyo (JP)

( * ) Notice: Subject to any disclaimer, the term of this patent is extended or adjusted under 35 U.S.C. 154(b) by 609 days.

(21) Appl. No.: 16/367,372

(22) Filed: Mar. 28, 2019

(65) Prior Publication Data

US 2019/0303795 A1    Oct. 3, 2019

Related U.S. Application Data

(60) Provisional application No. 62/649,620, filed on Mar. 29, 2018.

(51) Int. Cl.
*G06N 20/20* (2019.01)

(52) U.S. Cl.
CPC .................................. *G06N 20/20* (2019.01)

(58) Field of Classification Search
CPC ....................................................... G06N 20/20
USPC ............................................................ 706/12
See application file for complete search history.

(56) References Cited

U.S. PATENT DOCUMENTS 10,984,113 B1 *  4/2021  Dhaliwal ................ H04L 63/14

OTHER PUBLICATIONS

Rastogi, et al., "Public: A decision tree classifier that integrates building and pruning", Data Mining and Knowledge Discovery, 4, 315-344, 2000 (Year: 2000).*
Viola et al, "Fast and Robust Classification Using Asymmetric AdaBoost and a Detector Cascade," *Advances in Neural Information Processing Systems* (Dec. 2002).
Unknown, "OFAI MetaL Software:" 1-4 (Oct. 17, 2002).
Brazdil, et al, "Ranking Learning Algorithms: Using IBL and Meta-Learning on Accuracy and Time Results," Machine Learning, 50 (3): 251-277 (Dec. 2003).
Vanschoren, et al, "Stand on the Shoulders of Giants: Towards a Portal for Collaborative Experimentation in Data Mining," *Proceedings of the SoKD-09 International Workshop on Third Generation Data Mining at ECML PKDD*, 1 (Dec. 2009).
Vilalta, et al, "A Perspective View and Survey of Meta-Learning," *Artificial Intelligence Review*, 18 (2): 77-95 (Dec. 2002).
Pfahringer, et al, "Meta-Learning by Landmarking Various Learning Algorithms," *ICML* (Dec. 2000).
Todorovski, et al, "Combining Classifiers with Meta Decision Trees," Machine Learning, 50 (3): 223-249 (Dec. 2003).

(Continued)

*Primary Examiner* — Eric Nilsson
(74) *Attorney, Agent, or Firm* — Leydig, Voit & Mayer, Ltd.

(57) ABSTRACT

A method for ensemble machine learning includes: receiving input data and input models, the input models each having learning properties; generating perturbed data by adding noise to the input data; performing a landmarking operation on the perturbed data to generate meta-features that correlate with the learning properties of the input models; generating decision trees based on the input models and the meta-features.

15 Claims, 5 Drawing Sheets

(56) References Cited

OTHER PUBLICATIONS

Zenko, et al, "A Comparison of Stacking with Meta Decision Trees to Bagging, Boosting, and Stacking with Other Methods," *Data Mining* (Dec. 2001).

Mendes-Moreira, et al, "Ensemble Approaches for Regression: A Survey," *ACM Computing Surveys* (*CSUR*), 45 (1): 10 (Dec. 2012).

* cited by examiner

METHOD AND SYSTEM FOR MODEL INTEGRATION IN ENSEMBLE LEARNING

CROSS-REFERENCE TO RELATED APPLICATIONS

Priority is claimed to U.S. Provisional Patent Application No. 62/649,620, filed on Mar. 29, 2018, the entire disclosure of which is hereby incorporated by reference herein.

FIELD

The present invention relates to providing a method and system for model integration in ensemble learning.

BACKGROUND

Ensemble learning approaches combine hypotheses from different algorithms, and are able to achieve better results than single models that explore only one hypothesis at a time. This is why ensemble methods place first in many machine learning competitions, such as the Netflix Prize, Kaggle, and KDD 2009. The process of ensemble learning can be divided into three phases: a generation phase, a pruning phase, and an integration phase.

In the generation phase, the goal is to obtain a set of models. The models can be generated using the same induction algorithm, in which case the ensemble is homogeneous. Alternatively, models can be generated with different induction algorithms, in which case the ensemble is heterogeneous.

In the pruning phase, some of the models generated in the previous step can be eliminated without the reducing the accuracy of the ensemble.

In the integration phase, a method is defined to combine the predictions of the models from the resulting ensemble.

Mendes-Moreira, Joao, et al., "Ensemble approaches for regression: A survey," ACM Computing Surveys (CSUR) 45.1 (2012): 10, provides further discussion of ensemble learning approaches, the entire contents of which are hereby incorporated by reference herein.

Regarding the integration phase in particular, model integration approaches include: Voting or Averaging; Cascading; and Stacking.

Voting or Averaging: Voting is used in classification and averaging in regression. For both methods, multiple classification respective regression models are trained. The ensemble's prediction is the class that receives more than half of the votes, respective the averaged predictions from the individual models. In weighted voting or averaging, weights can be assigned to the models (e.g., as a bias).

Cascading: Cascading is an ensemble method that is based on the concatenation of multiple classifiers, where the output of a given classifier is considered additional information to the next classifier in the cascade. A further discussion of cascading can be found in Viola, Paul, and Michael Jones, "Fast and robust classification using asymmetric AdaBoost and a detector cascade," Advances in neural information processing systems (2002), the entire contents of which are hereby incorporated by reference herein.

Stacking: The stacking ensemble learning technique combines multiple classification or regression models via a meta-classifier or a meta-regressor. The base models are trained based on a complete training set, then the meta-model is trained on the outputs of the base level model as features. A further discussion of stacking can be found in Wolpert, David H, "Stacked generalization," Neural networks5.2 (1992): 241-259, the entire contents of which are hereby incorporated by reference herein.

Meta-decision trees, as well as methods such as bagging, boosting and stacking may also be used (e.g., for classification). For example, Todorovski, Ljupčo, and Sašo Děroski, "Combining classifiers with meta decision trees," Machine learning 50.3 (2003): 223-249 ("Todorovski"), and Zenko, Bernard, Ljupco Todorovski, and Saso Dzeroski, "A comparison of stacking with meta decision trees to bagging, boosting, and stacking with other methods," Data Mining, 2001. ICDM 2001, Proceedings IEEE International Conference on. IEEE, 2001 ("Zenko"), discuss meta-decision trees and compare meta-decision trees to bagging, boosting, and stacking. The entire contents of Todorovski and Zenko are hereby incorporated by references herein.

Brazdil, Pavel B., Carlos Soares, and Joaquim Pinto Da Costa, "Ranking learning algorithms: Using IBL and meta-learning on accuracy and time results," Machine Learning 50.3 (2003): 251-277, the entire contents of which are hereby incorporated by reference herein, provides further discussion on meta-learning approaches. Vanschoren, Joaquin, and Hendrik Blockeel, "Stand on the shoulders of giants. towards a portal for collaborative experimentation in data mining," Proceedings of the SoKD-09 International Workshop on Third Generation Data Mining at ECML PKDD 2009, Vol. 1. 2009, the entire contents of which are hereby incorporated by references, provides a discussion of a collaborative approach to experimentation in machine learning.

SUMMARY

According to an embodiment, method for ensemble machine learning is provided that includes: receiving input data and input models, the input models each having learning properties; generating perturbed data by adding noise to the input data; performing a landmarking operation on the perturbed data to generate meta-features that correlate with the learning properties of the input models; generating decision trees based on the input models and the meta-features.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
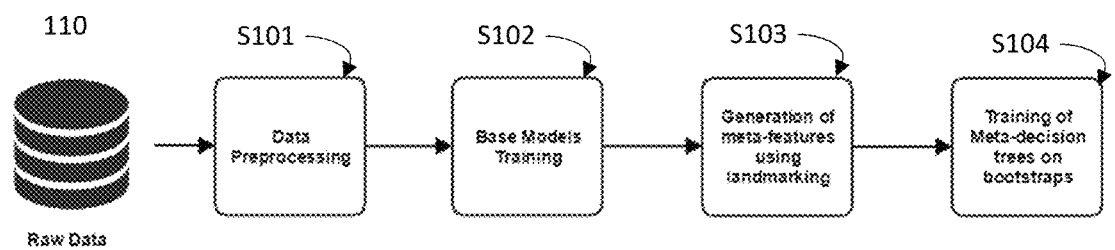
FIG. 1 illustrates a machine learning pipeline according to an embodiment.

Embodiments of the present invention relate to an integration phase of ensemble learning. The inventors have recognized that a problem to be solved in the integration phase is finding a combination of results of the individual pre-trained models that increases accuracy as compared to the best result of each individual model, while avoiding overfitting. Embodiments of the present invention increase the generalization ability (i.e., reduce the bias) of the meta-learner in spite of the potentially high variance of the base models.

Embodiments of the present invention include using lightweight landmarking algorithms on an input data perturbed by noise in order to generate meta-features that correlate with the learning properties of the given models with the ones illustrated by a problem in question. Landmarking exploits the performance of simple algorithms from different classes of learners (e.g., trees, instance-based learning, regression analysis, etc.) and uses the accuracy as relevant criteria for the meta-learner.

Landmarking algorithms may be used for ensembles in classification problems, as suggested, for example, in Vilalta, Ricardo, and Youssef Drissi, "A perspective view and survey of meta-learning," Artificial Intelligence Review 18.2 (2002): 77-95, the entire contents of which are hereby incorporated by reference herein. For instance, the European Project for Meta-Learning: METAL was focused solely on classification problems and so is its related software (as discussed at url:www.ofai.at/research/impml/metal/software), the entire contents of which are hereby incorporated by reference herein. The inventors have recognized that, for classification problems, meta-features are drawn from the probability distribution of the classes (see, e.g., Pfahringer, Bernhard, Hilan Bensusan, and Christophe G. Giraud-Carrier, "Meta-Learning by Landmarking Various Learning Algorithms," ICML. 2000, the entire contents of which are hereby incorporated by reference herein) which cannot be applied to regression.

Embodiments of the present invention provide meta-features for regression based on the landmarking technique, e.g. landmarker-specific features. Landmarkers-specific features (or predictor specific meta-features) are features that describe characteristics of the landmarker for each sample. An advantage of embodiments is that they enable landmarking in regression and classification problems. Accordingly, the present invention represents an improvement in the technical field of machine learning.

Embodiments of the present invention provide a method for accurate model integration in ensemble learning for supervised learning problems (e.g. regression or classification). Given a set of meta-learning (ML) models and input data, the method builds multiple decision trees based on meta-features that characterize the learning process. Meta-features are derived using the landmarking technique.

According to an embodiment, method for ensemble machine learning is provided that includes: receiving input data and input models, the input models each having learning properties; generating perturbed data by adding noise to the input data; performing a landmarking operation on the perturbed data to generate meta-features that correlate with the learning properties of the input models; generating decision trees based on the input models and the meta-features.

Generating the perturbed data can include: sampling the input data to generate M sub-datasets, M being an integer which equals the size of the input data; and adding the noise to each of the M sub-datasets to generate M modified datasets as the perturbed data.

The noise can be Gaussian noise and the noise added to each of the M sub-datasets can vary.

The landmarking operation can performed on each of the M modified datasets to generate M sets of the meta-features.

In an embodiment, N decision trees are created, each of the decisions trees corresponding to one of N sub-datasets generated by N random bootstraps of a set of data including the input data and the M sets of the meta-features.

The decision trees can be trained on N random bootstraps of the input data and predictions from the decision trees are averaged to generate an output.

The input models are regression models. The input models can be classification models.

In an embodiment, generating a decision tree of the decision trees includes assigning a leaf node by: performing a feature selection using a random search to determine a feature which corresponds to a partition of a node data set that minimizes an induction bias; determining a splitting criteria for a node, which corresponds to the node data set, based on two partitions of the feature that were determined as having minimized the induction bias more than other partitions that were evaluated; and assigning the leaf node according to a final partition, the final partition being determined according to the last splitting criteria determined for the node prior to determining a stopping criteria has been met.

In an embodiment, generating a decision tree includes: receiving a training set for the decision tree; selecting a node to split, splitting a node data set, which is a subset of the training set, into a plurality of partitions; evaluating the partitions to determine which of the partitions with respect to a maximum bias reduction (MBR) criteria to determine a feature of the training set that corresponds to a best partition from among the partitions; based on the best partition, determining a final split of the node data set upon meeting a splitting criteria to determine two new nodes each having a new node data set, which is the subset of the node data set; and determining whether a stopping criteria has been met. Upon determining the stopping criteria has not been met, the two new nodes can be selected as the node to split, the splitting of which occurs serially or in parallel. Upon determining the stopping criteria has been met, the two new nodes can be selected as leaf nodes of the decision tree.

The training set can include at least a subset of one or more of the input data, the input models, and the meta-features.

In an embodiment, the maximum bias reduction criteria is determined for a partition of the partitions by computing an average squared bias per base learner in the partition and determining as the bias reduction for the partition a minimum from among the average squared bias of every base learner of the partition. The best partition can be the partition having a maximum bias reduction from among the partitions.

In an embodiment, the method further includes: selecting two partitions associated with the feature that were determined as having minimized the induction bias more than other partitions that were evaluated when selecting the feature; making a new partition based on the two partitions; determining a bias reduction for the new partition; replacing one of the two partitions having a higher induction bias with the new partition; making another new partition and replacing one of the two partitions until the splitting criteria has been met; and determining that the splitting criteria has been met based on determining that a predetermined number of iterations has been exceeded without improving the MBR by more than a predefined setting.

According to another embodiment, a meta-learner is provided that has a processor coupled to a non-transitory storage memory containing instructions, which when executed by the processor, cause the meta-learner to: receive input data and input models, the input models each having learning properties; generate perturbed data by adding noise to the input data; perform a landmarking operation on the perturbed data to generate meta-features that correlate with the learning properties of the input models; generate decision trees based on the input data, the input models, and the meta-features.

According to another embodiment, a non-transitory processor-readable storage medium is provided that stores instructions that upon execution cause an meta-learner to: receive input data and input models, the input models each having learning properties; generate perturbed data by adding noise to the input data; perform a landmarking operation on the perturbed data to generate meta-features that correlate with the learning properties of the input models; generate decision trees based on the input data, the input models, and the meta-features.

FIG. 1 illustrates a machine learning pipeline 100 according to an embodiment.

As shown in FIG. 1, the pipeline 100 includes the following operations: (S101) Data preprocessing; (S102) Base Models Training; (S103) Generation of meta-features; and (S104) Training of meta-decision trees on bootstraps.

While the pipeline 100 is shown as a series of operations in FIG. 1, embodiments of the present invention are not so limited, and operations of the pipeline can be executed in parallel. For example, base model training (S102) can be done in parallel with other operations.

Data preprocessing (S101) can include data normalization, feature generation and selection. Accordingly, in the data preprocessing operation (S101), raw data is received from a data source 110, and is then processed to put the data in the appropriate form for other operations of the pipeline 100.

As discussed above, embodiments of the present invention employ ensemble learning. Ensemble learning aims at inducing a set of base learners to solve a problem (e.g., classification or regression). The set of base learners can be heterogeneous or homogenous.

During base model training (S102) each of the base learners from the set of base learners is induced on a replica of the pre-processed data (e.g., the training data). Because training the set of learners on the same data could lead to clones of the same model (e.g., in a homogenous system), embodiments of the present invention can employ various methods to diversify the ensemble of base learners, including by training each base learner on replicas of the pre-processed data that are generated by sampling (i.e., the replicas are not all the same). I an embodiment, the replicas are determined by bootstrapping (e.g., as discussed below in connection with FIG. 4).

The generation of meta-features (S103), as performed by embodiments of the present invention, exploits a mechanism called meta-learning. Meta-learning uses a set of attributes, called meta-features, to represent the characteristics of data mining tasks, and searches for the correlations between these attributes and the performance of learning algorithms.

In the generation of meta-features operation (S103), meta-features are added to the dataset and are used (along with the base features) to build the meta-decision tree. Multiple trees are created (as described below the trees may be created/trained using bagging and their predictions are averaged to generate the output). This method achieves a combination of the advantages of training awareness through landmarking and reduced overfitting through randomized input subsets.

Meta-features can be considered in two categories: (1) meta-features that describe the stability of the prediction; and (2) predictor specific meta-features.

Meta-features that describe the stability of the prediction may include, for example, descriptive statistics about the landmarkers predictions (e.g., standard deviation and mean of the predictions).

Predictor specific meta-features include features that describe characteristics of the landmarker for each sample. For example, a predictor-specific meta-feature for 1-nearest neighbor is the distance of a sample to the nearest neighbor, which shows the distribution of the samples around the nearest the number of samples that belong to the leaf, where a given sample is located, and the depth of the tree required to reach said leaf.

Meta-features, such as those described above, can be used alongside the original input features. By relying on decision trees as a meta-learner, embodiments of the present invention ensure that the samples will be split according to the most relevant features. As such, embodiments can rely on an implicit feature selection mechanism.

In embodiments, the generation of meta-features uses landmarking. Landmarking is a method to generate a type of meta-features. It relies on a set of simple and computationally efficient learning algorithms called landmarkers. For instance, some embodiments use one or more of the following algorithms as landmarkers: (1) 1-nearest neighbor; (2) LASSO; (3) MARS; and/or (4) CART. However, embodiments of the present invention are not limited to those landmarkers, but may use other landmarkers such as: (1) C5.0; (2) LTREE; (2) RIPPER; (4) Linear discriminant; and/or (5) Ridge Regression/Elastic Nets.

Figure 2:
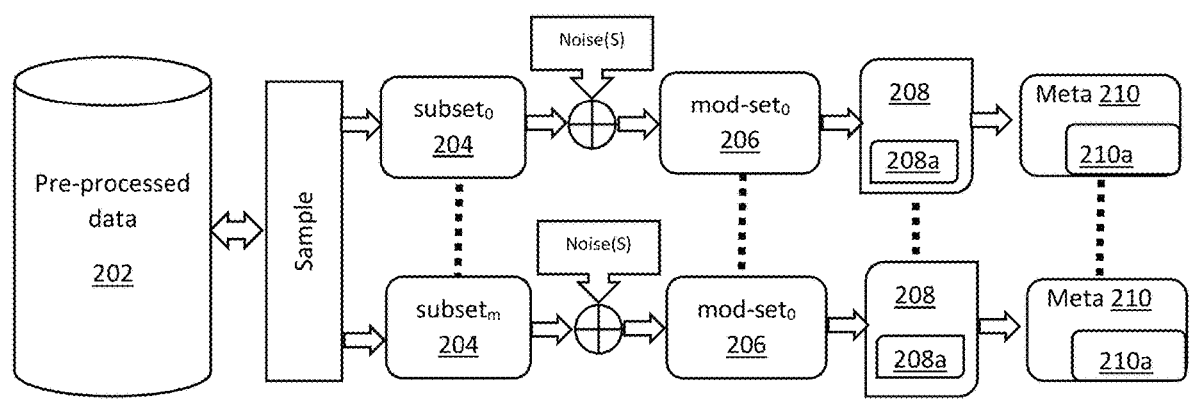
FIG. 2 illustrates a method for generating meta-features according to an embodiment.

FIG. 2 illustrates and embodiment of the operation for the generation of meta-features using landmarking (S103) according to the present invention.

As shown in FIG. 2, the pre-processed data set 202 (e.g., a set of feature vectors generated in operation S101) is sampled M times to create M sub-datasets 204. Gaussian noise is then added to each of the M sub-datasets 204 to create modified sub-datasets 206 (or perturbed sub-datasets). According to an embodiment, the size of the Gaussian noise is S. Thus, adding Gaussian noise to each sample of the dataset results in the modified sub-datasets 206 being M*S sub-datasets. According to an embodiment, the sampling is done per row, with M being the number of rows for the input data. In this way, new meta-features can be added to each of the M rows of input data, which as just described, are modified by adding noise.

The modified sub-datasets 206 are then sent to meta-feature generators 208 to generate meta-features 210 for each of the modified sub-datasets 206. According to embodiments of the present invention, the meta-feature generators 208 include at least one landmarker 208a, which executes a landmarking learning algorithm (e.g., 1-nearest neighbor, LASSO, MARS, CART, etc.). Thus, the modified sub-datasets 206 are used to train the landmarkers 208a to generate the landmarker meta-features 210a.

The pre-processed data set 202 together with the meta-features 210 (including landmarker meta-features 210a) can then used for building and/or training the meta-decision trees operation (S104).

Returning to FIG. 1, the machine learning pipeline 100 has, as its final operation, training meta-decision trees on random bootstraps (e.g., meta-bagging) (S104). According to some embodiments, this operation includes a tree building process (e.g., at least initially).

Figure 3:
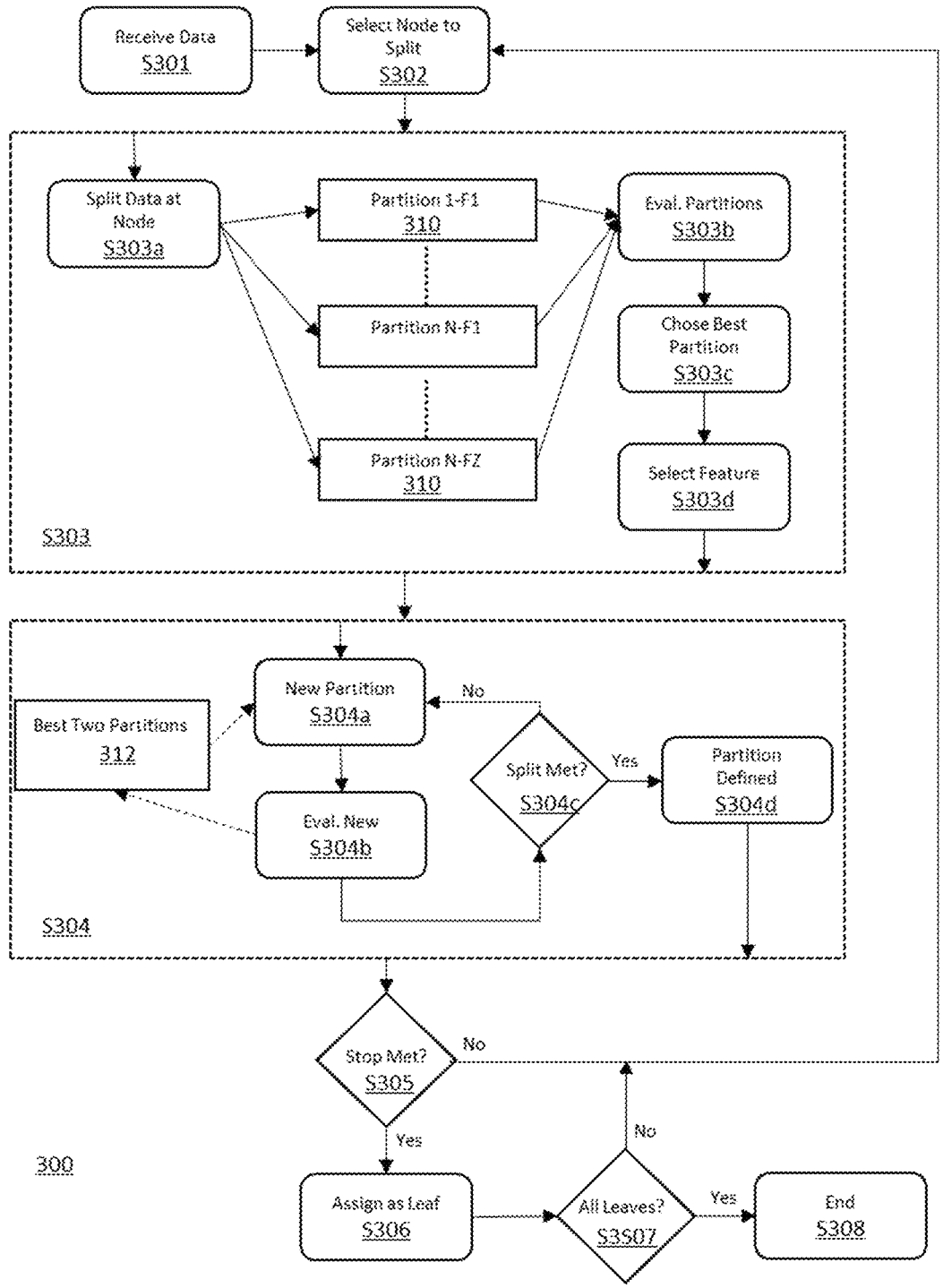
FIG. 3 illustrates a method for a building meta-decision tree according to an embodiment.

In an embodiment, the tree building process includes one or more of the following four aspects: (a) feature selection criteria using random search; (b) splitting criteria; (c) stopping criteria; and (d) assigning to the leaf the learner that provided the best Maximum Bias Reduction (MBR). An embodiment of a tree building process 300 according to the invention is illustrated in FIG. 3.

A decision tree builds regression or classification models in the form of a tree structure. Each decision tree breaks down a dataset into smaller and smaller subsets, while at the same time an associated decision tree is incrementally developed. The final result is a tree with decision nodes and leaf nodes. A decision node has two or more branches, each representing values for the attribute tested at that node. A leaf node represents a decision on the numerical or class target. The topmost decision node in a tree, which generally corresponds to the best predictor, is called a root node. The paths from root to leaf represent the regression or classification rules of the model. Accordingly, building a decision tree requires determining how (and where) to split the dataset (i.e., creating the decision nodes and branches) and when to stop splitting (i.e., creating the leaf nodes).

Building a decision tree starts at the root node. Accordingly, as shown in FIG. 3, the tree building process 300 beings with receiving a full set of training data for the decision tree (S301). The training data can include, the pre-processed data (e.g., feature vectors generated in operation S101), the updated base models (e.g., the base models updated from the base model training operation S103), and meta-features (e.g., meta-features 210, including landmarker meta-features 210a).

According to an embodiment, each decision tree is associated with its own corresponding set of training data. For example, meta-features are created and added to the input data (e.g., the pre-processed data 202) as described above in connection with FIG. 2. From this data set of the input data with meta-features, N bootstraps are created (e.g., via random sampling with replacement). The N bootstraps are then used to train the meta-trees. Thus, the tree building process 300 is performed for each of the meta-trees in the ensemble.

As described above, building a decision tree involves splitting a dataset into decision nodes that branch the data set into other partitions until stopping at terminal leaf nodes. Accordingly, the process includes selecting a node to split (S302). The first split is generally at the root node. Internal nodes (i.e., decision nodes) are split according to the same process as the root node, however, the data set being split is only that subset of the whole data set associated with the currently evaluated node (i.e., the parent node).

Feature Selection Criteria Using Random Search (S303):

At the selected node (e.g., the root node in the first instance), the training data set associated with that node is split for each feature (e.g., for the root node, the entire data set is be split for each feature) (S303a). Each split determines a potential partition 310 of the training data set of the selected node (i.e., defines a branch and child nodes of the decision tree).

In embodiments, the splits are binary (i.e., creating a branch to two new nodes from the selected node). The splitting points may also be selected randomly. Further, the splitting may be repeated Z times (e.g., Z=10; Z is a hyperparameter of the feature selection algorithm) for each feature. Thus, by way of illustration, where the splitting process is repeated Z=10 times for each feature, 10×2×N binary partitions 310 of the dataset are obtained (N being the number of features).

Each partition 310 is then evaluated with respect to Maximum Bias Reduction (MBR) criteria (S303b). For the new partitions, this includes computing the averaged squared bias per base model (BM) (or base learner (BL)) and selecting the minimum value (e.g. the lowest average bias of this new partition presented by any BM).

The MBR evaluation can be done according to the following equations:

$$MBR = \arg\max \; Best\_Bias^2(parent) - (prob\_left * Best\_Bias^2(left\_node) + prob\_right * Best\_Bias^2(right\_node))$$

$$Best\_Bias^2 = \arg\min_{m \in Base\_Models} \sum_{i \in Available\_Samples} [pred_i - real_i]^2$$

In embodiments, the partition 311 that minimizes the MBR and/or the induction bias is identified (S303c). Induction bias (also known as learning bias) of a learning algorithm is the set of assumptions that the learner uses to predict outputs given inputs that it has not encountered. (See for example, Mitchell, Tom M, "The need for biases in learning generalizations," New Jersey: Department of Computer Science, Laboratory for Computer Science Research, Rutgers Univ. (1980), the entire contents of which are hereby incorporated by references herein. The feature associated with this identified partition is selected (S303d).

Splitting Criteria (S304):

Here, the best two partitions 312 of the feature selected in previous step (S303d) are kept (e.g. best two partitions according to the MBR measure).

A new split within the sub-interval defined by the two splitting values of the best two partitions 312 (by going to mean value) is made (S304a). The MBR is then evaluated with for this new partition (S304b). The worst (e.g., as determined by MBR) previous split of the best two partitions 312 is replaced with this new split; thus, creating an updated best two partitions 312.

After updating the best two partitions 312, the splitting criteria operation (S304) determines whether a splitting criteria has been met (S304c). According to an embodiment, the spitting criteria is met once the operation passes a maximum number of iterations (e.g., MAX_ITERATIONS=3) without improving significantly the MBR.

According to an embodiment, significance is defined by epsilon, which is a hyperparameter. For example, if epsilon=1%, then a significant improvement would be an MBR that is lower than the previous MBR (measure for the previous split) by at least 0.01*previous_MBR (i.e., new_MBR−previous_MBR<0.01*previous_MBR). That is, the selection of the best splitting criteria is done according to the following: epsilon_MBR=1% over the MBR provided by the best initial splitting point, where epsilon_MBR is a hyperparameter of this algorithm.

If the splitting criteria is not met, then a new partitions is made (S304a) and evaluated (S304B) until the splitting criteria is met.

Once the splitting criteria is met, the partition with the best MBR of the best two partitions 312 is used to define the partition at the current node (S304d). In this manner, embodiments ensure that best splitting criteria is selected for the node.

The Feature Selection Criteria Operation (S303) and Splitting Criteria Operation (S304) can be done in parallel (e.g., working on different parts of the tree).

Stopping Criteria (S305):

The resulting nodes continue to be split until a certain stopping criteria is met. That is, new nodes will be made from the nodes just created until a leaf is identified. Accordingly, after a partition is defined (S304d), the tree building process 300 determines whether a stopping criteria has been met (S305).

In an embodiment, the stopping criteria is that MBR>epsilon, where epsilon=0.01 best_bias^2 (parent). In some embodiments, another (e.g., additional or alternative) stopping criteria is that the minimum number of samples reaches a certain percentage of the initial number of samples (e.g., MIN_NUM_SAMPLES=1% of INIT_NUM_SAMPLES). MIN_NUM_SAMPLES and epsilon are hyperparameters of the algorithm. Here, the samples can be the data samples that are within a leaf of a tree. As the tree is built, the data set is split according to the explained criteria. The number of samples (e.g., examples/rows from the initial dataset) is a parameter for the tree building process.

If the stopping criteria is not met, then at least one of the new nodes is selected (S302) and the tree building process continues to identify another partition. That is, the new nodes just determined are decision nodes and not leaf nodes.

If the stopping criteria is met, the learner that provided the best MBR is assigned to the leaf (S306).

The tree building operation 300, then determines whether all leaf nodes for the tree have been defined (S307). If they have not, then an existing node (not previously defined as a leaf) is selected (S302) and the tree building operation 300 continues. If all leaf nodes have been identified, then the tree building operation 300 ends and the decision tree is complete (S308).

According to an embodiment, each of the leaf nodes is a base model (e.g., learner) selected from the set of base models associated with the particular decision tree. Here, the base model for the leaf node is selected as the base model that made the best MBR as determined by the splitting criteria after meeting the stopping criteria for a particular branch. In an embodiment, the decision nodes enforce criteria that determine the path to the particular base model leaf for received input data. As such, the base model at the leaf node selected by the decision tree determines the prediction for the particular decision tree for input data. In training, this prediction can be checked against a target, and modifications can be made based on that result.

Figure 4:
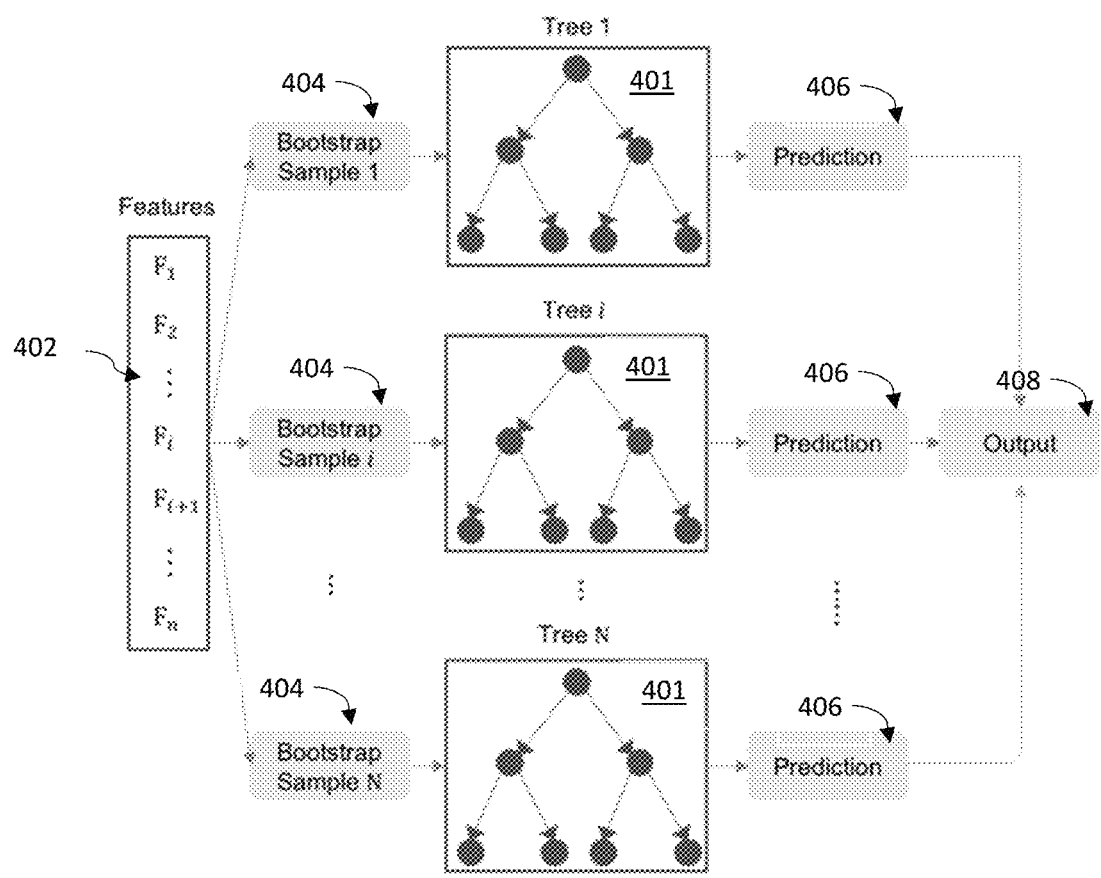
FIG. 4 illustrates a method for training the meta-decision trees on bootstraps according to an embodiment.

According to an embodiment, the trees are trained on random bootstraps and the prediction from the different trees is averaged, for example, as shown in the machine learning system 400 of FIG. 4.

Decision trees 401 are trained on bootstraps 404 of the training data 402. Bootstraps 404 (or bootstrap samples) are random samples of training data set 402 with replacement (i.e., an element of the data set may appear multiple times in the sample). In an embodiment, the training data 402 includes the pre-processed data generated in the data pre-processing operation S101 described in connection with FIG. 1.

According to an embodiment, one bootstrap sample 404 is generated for each decision tree 401 in the ensemble of the machine learning system 400.

In an embodiment, the bootstraps 404 may each be generated by performing a bootstrapping operation (e.g., random sampling with replacement) on the dataset that includes the input data (e.g., pre-processed data 202) and the generated meta-features. Here, the meta-features may be meta-features 210 (including landmarker meta-features 210a) generated in generation of meta-features operation S103 described in connection with FIG. 1. In which case, each bootstrap 404 can include a sampling of the input data and the meta-features.

In the machine learning system 400, each of the decision trees 401 makes a prediction 406 (i.e., is trained to predict a target value from an input feature). Because this is an ensemble system, the different predictions are aggregated together to generate the output 408. In an embodiment, the output can be an average of each of the predictions, including a weighted average. In the case of a weighted average, each tree may have an associated bias factor (or weight) given to its prediction 406. The bias factor can be adjusted by the training process based on, for example, the accuracy of the trees.

This technique just described is called bootstrap aggregation (i.e., bagging) (for more information on bagging, see, e.g., Breiman, Leo, "Bagging predictors," Machine learning 24.2 (1996): 123-140, the entire contents of which are hereby incorporated by reference herein).

An advantage of embodiments that implement bagging is that the variance is reduced, which helps avoid overfitting.

In supervised machine learning problems (e.g., where the data is labeled: the target is defined for instance classes or numerical values), the error can be divided into bias and variance. Bias arises from the simplifying assumptions made by a model to make the target function easier to learn. Variance is the amount that the estimate of the target function will change if different training data was used.

Overfitting and underfitting are two of the biggest problems in machine learning. Overfitting refers to a model that models the training data too well. Overfitting happens when a model learns the detail and noise in the training data to the extent that it negatively impacts the performance of the model on new data. This means that the noise or random fluctuations in the training data is picked up and learned as concepts by the model. The problem is that these concepts do not apply to new data and negatively impact the models ability to generalize. Underfitting refers to a model that neither models the training data nor generalizes to new data.

Accordingly, embodiments of the present invention improve ensemble learning technology by providing robust model integration that uses landmarkers to represent the learning process of pre-trained models and partition the input data space consequently, and trains multiple meta-decision trees on bootstraps to reduce overfitting for meta-learning problems.

An advantage of the present invention is that it provides higher accuracy as compared to current types of meta-features or integration schema. Another advantage is that methods described herein provide more accurate predictions, without increased overfitting. Still another advantage of the present invention is that the methods described herein are applicable to regression and classification problems.

Another advantage of embodiments of the present invention is that, rather than being confined to one method (e.g., one a method for travel time prediction using a single learning algorithm), which may perform differently on different datasets, meta-learning methods according to the present invention ensures robust predictions starting from N given learning models.

According to an embodiment, dynamic pricing for public transport is calculated using ensemble learning. For example, some transport operators determine their price ranges according to the passenger demand. The prices are thus regularly predicted to ensure adaptiveness and maximize profit margin. In this application, the input data (e.g., the input data used by a landmarking operation according to integration methods described herein) can be automatic fare control (AFC) data, which details usage of smart cards by passengers. The passenger demand may be quantified per stop id and/or per time period. Reliable and accurate predictions of the passenger demand allow the operator to dynamically adjust the prices. Furthermore, by relying on decision trees on the meta-level, adaptiveness can be achieved, because the tree structure can be modified, for example, by pruning the tree, merging nodes, or setting updated boundaries for relevant decision variables. An advantage of the present invention is that combining predictions from a set of strong models that can be trained (e.g., trained overnight) improves the prediction accuracy as compared to relying on a single model.

According to an embodiment, travel time prediction in public transport is calculated using ensemble learning. Travel time prediction may be used, for example, in scheduling (e.g., bus scheduling) and/or for real time control. According to an embodiment, the input data (e.g., the input data used by a landmarking operation according to integration methods described herein) is automated vehicle location (AVL) data. For example, AVL data may include details for a given bus route arrival and/or departure times as respective from stops per trip id. This data is used to predict the vehicle travel times (for example, round trip times or for sections of the journey) which can be crucial for defining a reliable schedule (e.g., providing low estimated waiting times) that depicts the dynamics of mobility in a given city. The robust predictions enabled by the landmarking and the overfitting avoidance techniques of embodiments lead to more reliable schedules and higher customer satisfaction.

According to an embodiment, a retail sales forecast is calculated using ensemble learning. According to an embodiment, the input data (e.g., the input data used by a landmarking operation according to integration methods described herein) includes one or more of data about product purchases per customer id, and dates of purchase and prices. Retail stores can the use the meta-learning technique according to embodiments of the invention to accurately predict future purchases for customers. Such predictions can lead to a better marketing strategy and thus higher income.

Figure 5:
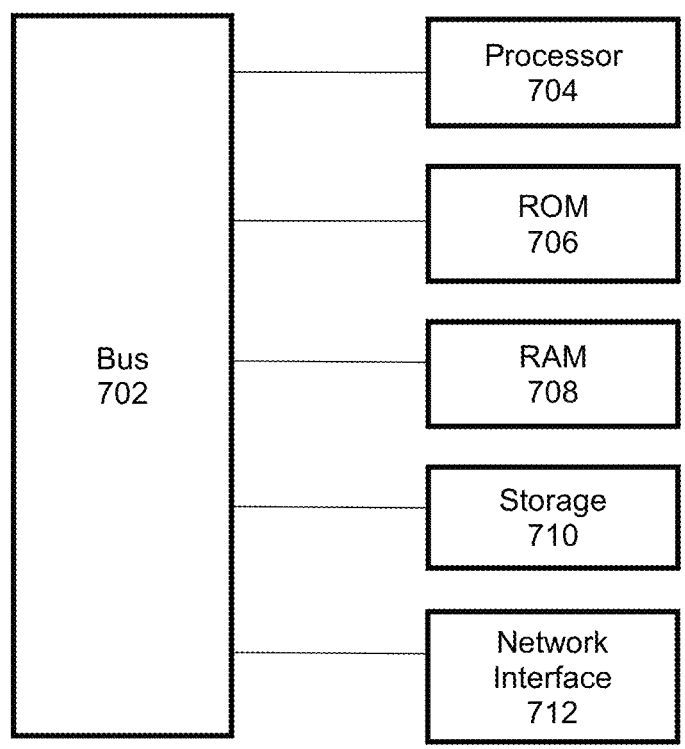
FIG. 5 is a block diagram of a processing system according to an embodiment.

FIG. 5 is a block diagram of a processing system according to one embodiment. The processing system is a specialty computer configured and programmed to embody and perform the ensemble learning systems and methods of the present invention. The processing system includes a processor 704, such as a central processing unit (CPU) of the computing device or a dedicated special-purpose infotainment processor, executes computer executable instructions comprising embodiments of the system for performing the functions and methods described above. In embodiments, the computer executable instructions are locally stored and accessed from a non-transitory computer readable medium, such as storage 710, which may be a hard drive or flash drive. Read Only Memory (ROM) 706 includes processor executable instructions for initializing the processor 704, while the random-access memory (RAM) 708 is the main memory for loading and processing instructions executed by the processor 704. The network interface 712 may connect to a wired network or cellular network and to a local area network or wide area network, such as the Internet.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method for ensemble machine learning, the method comprising:
    receiving input data and input machine learning models, the input machine learning models each having learning properties;
    training the input machine learning models to generate trained input machine learning models;
    generating perturbed data by adding noise to the input data;
    performing a landmarking operation on the perturbed data to generate meta-features that correlate with the learning properties of the input machine learning models; and
    generating meta-learner decision trees based on the trained input machine learning models, the input data, and the meta-features, each of the meta-learner decision trees comprising respective nodes, including leaf nodes and decision nodes, each of the leaf nodes respectively corresponding to one of the trained input machine learning models and the decision nodes being configured to determine partitions of an input data set that are respectively received by the trained input machine learning model at the leaf nodes.

2. The method according to claim 1, wherein generating the perturbed data comprises:
    sampling the input data to generate M sub-datasets, M being an integer which equals the size of the input data; and
    adding the noise to each of the M sub-datasets to generate M modified datasets as the perturbed data.

3. The method according to claim 2, wherein the noise is Gaussian noise and the noise added to each of the M sub-datasets varies.

4. The method according to claim 2, wherein the landmarking operation is performed on each of the M modified datasets to generate M sets of the meta-features.

5. The method according to claim 4, wherein N meta-learner decision trees are created, each of the meta-learner decisions trees corresponding to one of N sub-datasets generated by N random bootstraps of a set of data comprising the input data and the M sets of the meta-features.

6. The method according to claim 1, wherein the meta-learner decision trees are trained on N random bootstraps of the input data and predictions from the meta-learner decision trees are averaged to generate an output.

7. The method according to claim 1, wherein the input machine learning models are regression models.

8. The method according to claim 1, wherein the input machine learning models are classification models.

9. The method according to claim 1, wherein generating a decision tree of the meta-learner decision trees comprises assigning a leaf node, of the leaf nodes, by:
   performing a feature selection using a random search to determine a feature which corresponds to a partition of a node data set that minimizes an induction bias;
   determine a splitting criteria for a node, of the nodes, which corresponds to the node data set, based on two partitions of the feature that were determined as having minimized the induction bias more than other partitions that were evaluated; and
   assigning the leaf node according to a final partition, the final partition being determined according to the last splitting criteria determined for the node prior to determining a stopping criteria has been met.

10. The method according to claim 1, wherein generating a decision tree of the meta-learner decision trees comprises:
    receiving a training set for the decision tree;
    selecting a node, of the nodes, to split,
    splitting a node data set, which is a subset of the training set, into a plurality of partitions;
    evaluating the partitions to determine which of the partitions with respect to a maximum bias reduction (MBR) criteria to determine a feature of the training set that corresponds to a best partition from among the partitions;
    based on the best partition, determining a final split of the node data set upon meeting a splitting criteria to determine two new nodes each having a new node data set, which is the subset of the node data set; and
    determining whether a stopping criteria has been met,
    wherein upon determining the stopping criteria has not been met, the two new nodes are selected as the node to split, the splitting of which occurs serially or in parallel, and
    wherein upon determining the stopping criteria has been met, the two new nodes are selected as two of the leaf nodes of the decision tree.

11. The method according to claim 10, wherein the training set comprises at least a subset of one or more of the input data, the input machine learning models, and the meta-features.

12. The method according to claim 10,
    wherein the maximum bias reduction criteria is determined for a partition of the partitions by computing an average squared bias per base learner in the partition and determining as the bias reduction for the partition a minimum from among the average squared bias of every base learner of the partition, and
    wherein the best partition is the partition having a maximum bias reduction from among the partitions.

13. The method according to claim 10, the method further comprising:
    selecting two partitions associated with the feature that were determined as having minimized the induction bias more than other partitions that were evaluated when selecting the feature;
    making a new partition based on the two partitions;
    determining a bias reduction for the new partition;
    replacing one of the two partitions having a higher induction bias with the new partition;
    making another new partition and replacing one of the two partitions until the splitting criteria has been met; and
    determining that the splitting criteria has been met based on determining that a predetermined number of iterations has been exceeded without improving the MBR by more than a predefined setting.

14. A meta-learner comprising a processor coupled to a non-transitory storage memory containing instructions, which when executed by the processor, cause the meta-learner to:
    receive input data and input machine learning models, the input machine learning models each having learning properties;
    train the input machine learning models to generate trained input machine learning models;
    generate perturbed data by adding noise to the input data;
    perform a landmarking operation on the perturbed data to generate meta-features that correlate with the learning properties of the input machine learning models; and
    generate meta-learner decision trees based on the input data, the trained input machine learning models, and the meta-features, each of the meta-learner decision trees comprising respective nodes, including leaf nodes and decision nodes, each of the leaf nodes respectively corresponding to one of the trained input machine learning models and the decision nodes being configured to determine partitions of an input data set that are respectively received by the trained input machine learning model at the leaf nodes.

15. A non-transitory processor-readable storage medium storing instructions that upon execution cause a meta-learner to:
    receive input data and input machine learning models, the input machine learning models each having learning properties;
    train the input machine learning models to generate trained input machine learning models;
    generate perturbed data by adding noise to the input data;
    perform a landmarking operation on the perturbed data to generate meta-features that correlate with the learning properties of the input machine learning models; and
    generate meta-learner decision trees based on the input data, the trained input machine learning models, and the meta-features, each of the meta-learner decision trees comprising respective nodes, including leaf nodes and decision nodes, each of the leaf nodes respectively corresponding to one of the trained input machine learning models and the decision nodes being configured to determine partitions of an input data set that are respectively received by the trained input machine learning model at the leaf nodes.

* * * * *